United States Patent [19]

Loran et al.

[11] Patent Number: 4,848,295
[45] Date of Patent: Jul. 18, 1989

[54] AXIAL FLOW ROTARY ENGINE

[76] Inventors: William Loran, 100 Thorndale Dr., #356, San Rafael, Calif. 94903; Merritt A. Robinson, 475 Fawn Dr., San Anselmo, Calif. 94960

[21] Appl. No.: 252,811

[22] Filed: Oct. 3, 1988

Related U.S. Application Data

[63] Continuation of Ser. No. 79,704, Jul. 30, 1987, abandoned.

[51] Int. Cl.[4] .............................................. F02B 53/00
[52] U.S. Cl. ..................................... 123/222; 123/238
[58] Field of Search ................. 123/204, 222, 235, 238

[56] References Cited

U.S. PATENT DOCUMENTS 1,688,816  10/1928  Kraus ................................. 123/235

FOREIGN PATENT DOCUMENTS

| 102743 | 12/1937 | Australia | 123/238 |
| 1451839 | 8/1969 | Fed. Rep. of Germany | 123/222 |
| 2417074 | 10/1975 | Fed. Rep. of Germany | 123/238 |
| 625277 | 9/1961 | Italy | 123/238 |
| 161944 | 12/1980 | Japan | 123/238 |
| 353575 | 5/1961 | Switzerland | 123/204 |

Primary Examiner—Michael Koczo
Attorney, Agent, or Firm—Melvin R. Stidham

[57] ABSTRACT

The disclosure is of an axial flow rotary internal combustion engine constructed in three sections, a compressor section, a combustion section and an expander section. The compressor section includes male and female rotors with complementary, single turn lobe and groove in which an air-fuel mixture is compressed and discharged from a port at the end of the groove as the port overtakes and traverses an arcuate intake port in the cylindrical combustion block, which is rotating at a slower speed. After the intake port is traversed and sealed off, an ignition port in the combustion chamber exposes a spark plug and the mixture is ignited. Substantially complete combustion takes place while the combustion chamber is sealed off and isolated. Then an entry port into the helical groove of female expander rotor overtakes and traverses an arcuate combustion chamber exhaust port and the combusted gases are discharged and expanded into the expander section. The expander section comprises a pair of complementary male and female rotors with complementary helical groove and lobe and are of a larger volume than the compressor rotors to enable full expansion. Power is taken off a shaft of one of the expander rotors.

16 Claims, 2 Drawing Sheets

AXIAL FLOW ROTARY ENGINE

RELATED APPLICATION

This application is a continuation of our co-pending application Ser. No. 07/079,704, filed July 30, 1987 for "Axial Flow Rotary Engine," now abandoned.

BACKGROUND OF THE INVENTION

An internal combustion engine of the rotary type has a number of advantages over a conventional reciprocating engine. For example, the rotary engine has substantially fewer moving parts; it does not have the dynamic balancing, vibration and inertia problems that occur in reciprocating engines, particularly at high speeds; and it has higher power output capabilities per unit of weight.

PRIOR ART

British Pat. No. 889,246 granted to Hardy in 1962 shows a rotary engine with compressor and turbine of the intermeshing screw type. However, the fixed combustion chamber is always in communication with the compression and expansion rotors. This creates losses and excessive pressure on the compressor. Further, the overall engine size is excessive because of the lengthy compression and expansion sections required.

In Schmidt U.S. Pat. No. 3,518,875 the combustion chamber is undesirably long and narrow and there is no provision for seals or lubrication. Moreover, there is no efficient sealing of the combustion chamber.

In Nilsson U.S. Pat. No. 2,622,787, there is no suggestion as to how a combustion chamber might fit and the porting system employed does not lend itself to the low volume, sharply defined space required for a practical combustion chamber.

In Kraus U.S. Pat. No. 1,688,816, the combustion chamber is long and thin, extending from the central, transfer chamber through to the arcuate expansion chamber. The spark plug is actually positioned in the expansion chamber, and the fuel charge is ignited as the transfer chamber opens to the expansion chamber. In the elongated expansion chamber, combustion continues over an extended period.

Japanese Pat. No. 58-160515 (1983) and German Pat. No. DE 332-707A (1985) both show long, narrow combustion chambers which are of an ineffecient shape, and they both show identical rotor profiles.

OBJECTS OF THE INVENTION

It is an object of this invention to provide an axial flow rotary engine that is economical to manufacture and efficient in operation.

It is a further object of this invention to provide a rotary type, axial flow, internal combustion engine with means for effectively sealing off the combustion chamber from both the compression chamber and the expansion chamber.

It is a further object of this invention to provide a rotary type axial flow engine with a separate combustion chamber to provide complete and efficient combustion in advance of expansion.

It is a further object of this invention to provide a rotary type axial flow, internal combustion engine with a separate expansion chamber to ensure complete expansion and utilization of the combusted gases.

It is a further object of this invention to provide a rotary type, positive displacement internal combustion engine that has few moving parts.

It is a further object of this invention to provide an axial flow internal combustion engine that converts more thermal energy to mechanical energy.

It is a further object of this invention to provide an axial flow internal combustion engine that has intake, compression, combustion, power and exhaust stages in a single housing.

It is a further object of this invention to provide for more complete combustion in an axial flow rotary engine so as to achieve reduced polution and increased efficiency.

It is a further object of this invention to provide an axial flow rotary engine with a combustion chamber configuration that minimizes any tendency to foster premature ignition of gases.

It is a further object of this invention to provide an axial flow, rotary type engine that is compact in construction.

Other objects and advantages of this invention will become apparent from the description to follow, particularly when read in conjunction with the accompanying drawing.

SUMMARY OF THE INVENTION

In the rotary engine of this invention, there are an axial flow rotary compressor section, a multi-chambered, rotating combustion section and an axial flow rotary expansion section, all placed in tandem within a single housing. Valving is accomplished through ports in the mating, circular ends of the rotors, utilizing their differential speeds to open and close ports by bringing them into and out of alignment. The compressor section comprises a pair of male and female screw-type rotors mounted for rotation about parallel axes. The compressor rotors have cylindrical bodies of equal diameter, there being a single-turn helical groove formed in and around the cylindrical body of the female rotor. Compressed gases are discharged through a passageway which extends from the end of the helical groove to open in a discharge port in the circular end wall of the female rotor, and as the discharge port overtakes and passes along an arcuate port in an engaging circular end wall of a slower turning combustion chamber housing, the gases are transferred. Then when the female compressor rotor rotates further ahead of the combustion housing to close off the entry port into the combustion chamber, the compressed gases are ignited. After complete combustion within the sealed chamber, the combusted gases are discharged through a combustion chamber exhaust port, as an intake port in the circular end of the mating female rotor of the expansion section overtakes it and rotates past.

The expansion section also comprises a pair of male and female screw-type rotors, basically with cylindrical bodies of equal diameter, having complementary, single-turn helical lobes and grooves. The expander rotors are of larger diameters and/or lengths then those of the compressor section to provide greater volume for more complete expansion of the hot combusted gases. A portion of the output from the engine is employed through suitable gearing to drive the compressor rotors.

DESCRIPTION OF A PREFERRED EMBODIMENT

Figure 1:
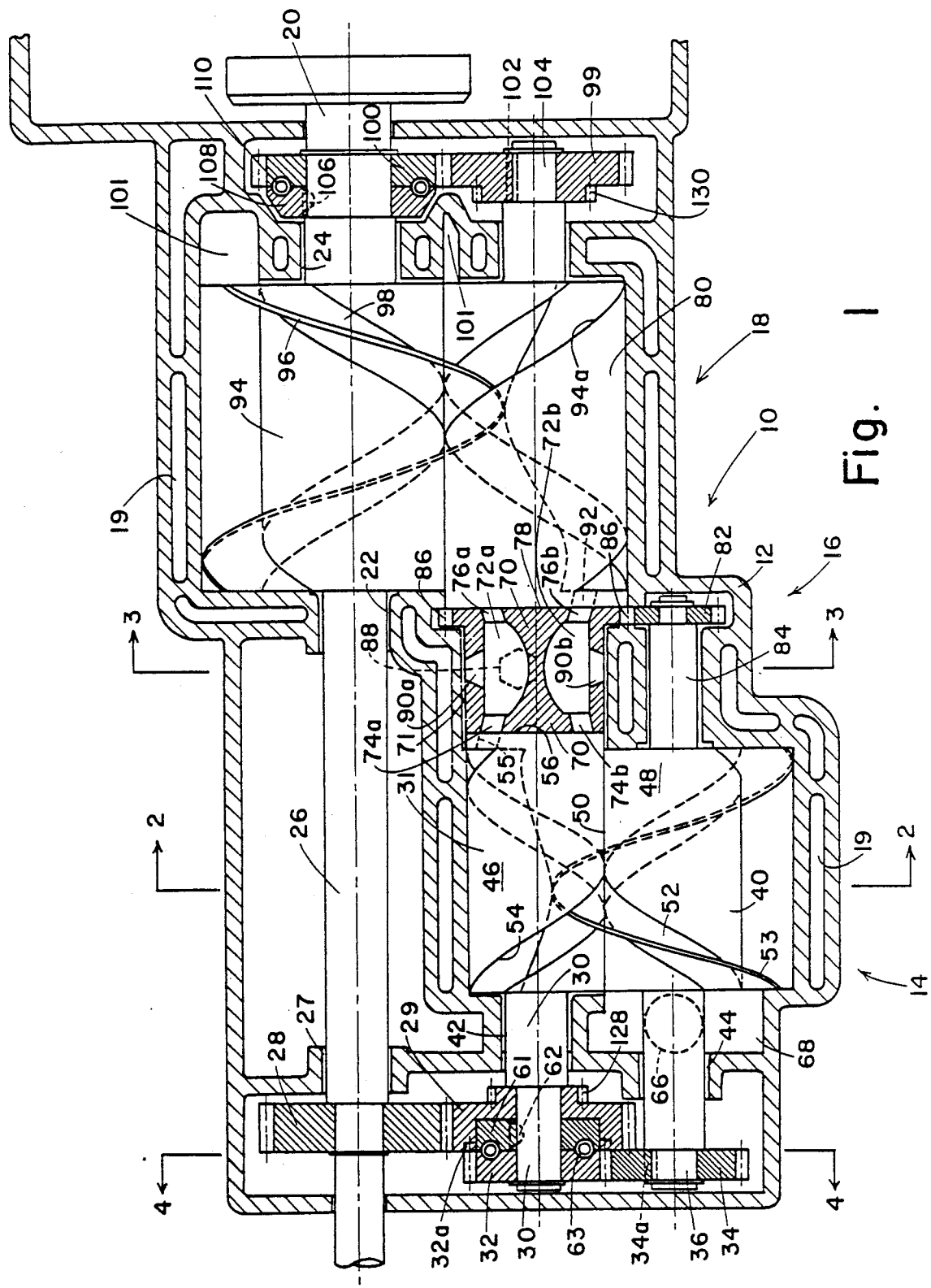
FIG. 1 is a horizontal section view taken through an axial flow rotary engine embodying features of this invention.
Figure 3:
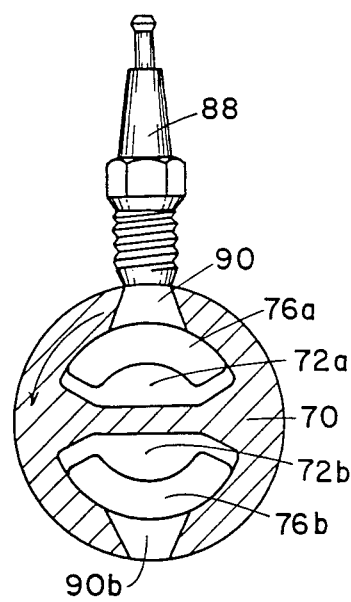
FIG. 3 is a partial vertical section view taken along line 3—3 of FIG. 1.

Referring now to the drawing with greater particularity, the axial flow rotary engine 10 of this invention preferably comprises a single housing 12 formed with a compressor section 14, a combustion section 16 and an expansion or turbine section 18. The housing 12 is provided with cooling jackets 19 for circulation of cooling water around all three sections 14, 16 and 18.

The output of the rotary engine is delivered at power shaft 20, which is rotatably mounted in suitable bearings 22 and 24 in the expander section 18. A power takeoff, rearward extension 26 of the output shaft 20 is further rotatably mounted at 27 and employed to drive the compressor unit 14.

The Compression Section

Specifically, a gear 28 on the power takeoff shaft 26 drives a gear 29, which is rotatably mounted on the input shaft 30 of the female compressor rotor 31. The input shaft 30 carries a rotatably mounted timing gear 32 meshing with a complementary timing gear 34 keyed at 34a to the shaft 36 of the male compressor rotor 40, so that both rotor shafts 30 and 36 rotate at the same speed. The compressor rotor input shafts 30 and 36 are journalled in bearings 42 and 44 in the housing 12.

The female and male compressor rotors 31 and 40 have basically cylindrical bodies 46 and 48, which are of the same diameter, rotating on parallel axes in tangential sealing engagement along contact line 50. The male rotor 40 preferably has a single turn helical lobe 52 of one complete turn and the female rotor 31 has a single turn, complementary groove 54. The helical groove 54 terminates short of the downstream end 56 of the female rotor 31 to form a circular end plate through which a compressor exit port 55 extends to open through the circular end 56 of the cylindrical female rotor body 46.

Figure 2:
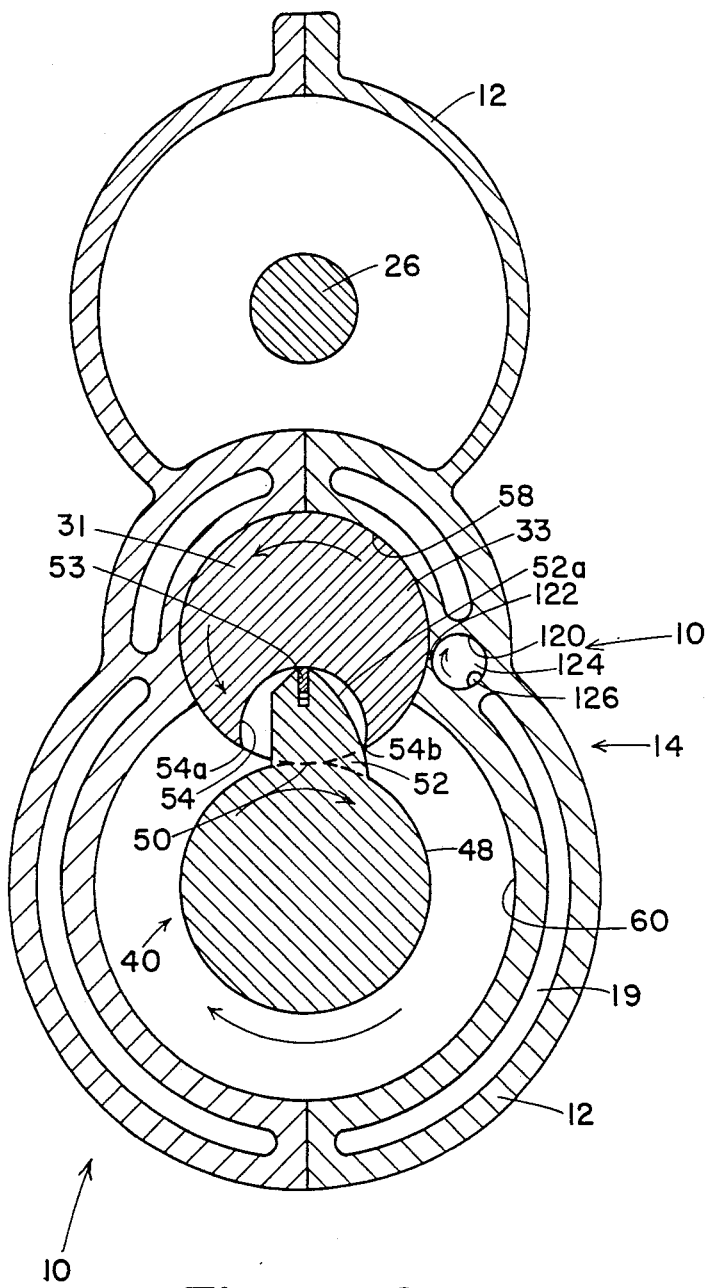
FIG. 2 is a vertical section view taken along line 2—2 of FIG. 1.

As shown in FIG. 2, the compression section chamber housing 12 forms a pair of intersecting internal cylinders 58 and 60, with the smaller upper cylinder 58 snugly receiving the female rotor 31 and the larger lower cylindrical 60 snugly receiving the helical lobe 52 around the male rotor 40. The overall radius of the lobe is slightly less than $\sqrt{3}r$, where r equals the radius of the basic cylindrical rotor bodies 46 and 48. These proportions cause a spring mounted wiper seal 53 in the tip of the lobe 52 to pass one cusp 54b of the female rotor 31 at the same instant that the other cusp 54a is just making contact with the basic cylindrical surface 48 of the male rotor 40. Thus, at all times a minimum of two sealing lines are provided, one seal moving around the groove or recess 54 from cusp 54a to cusp 54b and then around the interior surface of the cylindrical chamber 60; and the other seal 50 achieved at the tangential line contact 50, which is substantially stationary.

Figure 4:
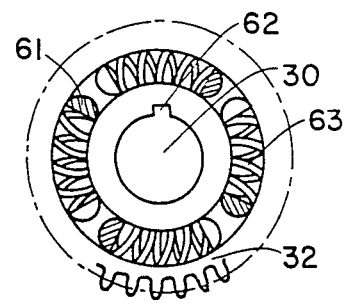
FIG. 4 is a partial vertical section view taken along line 4—4 of FIG. 1.

The continuous seal maintained by pressing the leading surface 52a of the lobe 52 against the downstream cusp 54b of the female rotor 31 is achieved by spring loading the compressor rotor timing gears 32 and 34. As shown in FIGS. 1 and 4, a carrier ring 61 for the input gear 29 is keyed at 62 to the female rotor shaft 30 and the associated timing gear 36 is rotatable thereon. Compression springs 63 are mounted between the carrier ring 61 and the timing gear 32 to bias the timing gear 32, and hence, the mating timing gear 34 in a forward direction. Any resistance to turning may be absorbed by the compression springs 63. The gears 29 and 32 are keyed together at 32a by an extension of gear teeth. The gears 29 and 32 may be set to yieldably press the lobe 52 of the male compressor rotor 40 against the downstream cusp of the female rotor 31. In addition, the spring 63 will compensate for wear on the tooth or lobe 52.

The wiper seal 53 is slidably carried in a slot that extends along the outer tip of the helical lobe 52, and is spring mounted so as to be biased against the inner surface 54a to 54b of the female groove 54 and then against and around the cylindrical surface 60 of the compressor chamber. The wiper ring 53 is of a low density, low friction material so as to minimize centrifugal forces and heat of friction, and is heat resistant for high temperature operation. A suitable material is graphite-fluorocarbon. Similar wiper seals 53 are provided on both the compressor and expander sections 14 and 18.

In operation, the compressor rotors 31 and 40 are in continuous rotation with an air-fuel mixture being drawn in through an intake port 66 to the intake space 68 and then between the compressor section rotors 31 and 40 where the air-fuel mixture is forced downstream and compressed between the lobe 52 and the walls of the groove 54, finally being forced through the exit port 55 opening from the end of the helical groove 54 and the otherwise solid circular wall 56 of the female rotor 31.

The Combustion Section

The combustion section 16 comprises a generally cylindrical, body or block 70 rotatably mounted in a complementary cylindrical chamber 71, which is formed in the housing 12 between the compression and expansion sections 14 and 18. The combustion chamber block 70 has two semi-cylindrical combustion chambers 72a and 72b, each with an arcuate intake port 74a and 74b and an arcuate exhaust port 76a and 76b. The intake and exhaust ports 74 and 76 are normally closed by snug sealing engagement of the circular end walls of the combustion chamber block 70 with the circular end walls 56 and 78 of the female compressor rotor 31 and the female expander rotor 80 to be further described. A pinion 82 on the male compressor rotor shaft 84 drives a gear 86 on the cylindrical combustion block 70 to rotate the combustion block or housing 70 at one-half the speed of the compressor rotors 31 and 40, (also at one-half the speed of the expander rotors 80 and 94 to be described) so that during successive revolutions of the compressor rotors, the compressed air-gas mixture is delivered to alternate chambers 72a and 72b of the combustion unit 16.

A spark plug 88 is mounted in the housing 12 and a spark port 90a or 90b in each combustion chamber 72a and 72b aligns with the spark plug at the appropriate instant for ignition. After combustion, the arcuate exhaust port 76a or 76b of the combustion chamber remains closed for a period to ensure complete combustion, and then the fully combusted gases are evacuated as the entry port 92 into the female expander rotor 80 overtakes the exhaust port 76a or 76b and overtakes the exhaust port 76a or 76b and rotates past.

The Expansion Chamber

The expansion or turbine section 18 is very similar in construction to the compressor 14 but with a larger total volume, in the order of twice the compressor volume to allow for more complete expansion of the hot combusted gases within the engine 10. The female expander rotor 80 is coaxial with the female compressor 31, and the male expander rotor 94 is preferably disposed 180° from the axis of the male compressor rotor 31 so as to time properly with the combustion chamber exhaust ports 76a and 76b. Spring-biased wiper seals 96 are mounted in the lobe 98 of the male expander, as in the compressor rotor, and in driving, the upstream cusp of the female rotor is maintained in contact with the trailing face of the male rotor lobe 98. This sealing relationship is maintained by spring loading the output timing gears 99 and 100.

Specifically, the one timing gear 99 is keyed at 102 to the female rotor shaft 104 while the other timing gear 100 is rotatably carried on the male rotor shaft 20, i.e. the output shaft. Keyed at 106 on the output shaft 20 is a support ring 108 and a series of compression springs 110 yieldably bias the timing gear 100 in a direction to maintain sealing contact between the expander lobe 98 and groove 94a.

Operation

As the male and female compressor rotors 31 and 40 rotate about parallel axes they draw in from the intake chambers 68 a fuel-gas-air mixture (or just air in case of diesel operation) and, when the lobe 52 moves around cylindrical chamber wall 60 and into sealing engagement with the wall of the groove 54 of the female rotor 31, the air-fuel mixture is trapped and forced toward the right in FIG. 1 and compressed against the downstream end 56 of the compression section 14.

In the meantime, the combustion unit cylindrical block 70 is being rotated by engagement of the gears 82 and 86, in the same direction of rotation as that of the female rotor 40 though at one-half the speed. At a fixed time, the compressor transfer port 55 overtakes the arcuate entry port 74a of the combustion chamber 72a and, as the two continue to rotate in the same direction, the transfer port 55 traverses the arcuate combustion entry port 74a. When the compressor transfer port 55 passes the arcuate port 74a and is opposed by the imperforate upstream surface of the cylindrical combustion unit 70, the combustion chamber 72a is sealed off. Then, at a predetermined time, the ignition port 90a of the upper combustion chamber 72a moves into alignment with the spark plug 88 and the spark ignites the compressed gas-fuel mixture.

In an alternative embodiment for diesel operation, air alone could be compressed in the compressor section and introduced through an aligned port 74a or 74b into a combustion chamber 72a or 72b. Then, during a precisely defined period, diesel fuel is injected through port 90a and ignited by heat of compression.

In the meantime, the female expander rotor 80 is also rotating coaxially with, and in the same direction as, the combustion unit block 70 and, at a predetermined time in its rotation, the expander entry port 92 overtakes and traverses the arcuate combustion chamber exhaust port 76a, which is now in the position of the lower combustion chamber. The combusted gases expand rapidly into the expander section 18 to drive the helical lobe 98 before it and impel the expander rotors 80 and 94 to power the output shaft 20.

At the same time, the initially lower combustion chamber 72b has moved to the position of the upper combustion chamber and a compressed air-fuel mixture (or air alone in the case of diesel operation) is delivered to the upper combustion chamber as the lower combustion chamber is delivering its combusted gases for expansion in the expander chamber 18.

In the preferred embodiment shown, the combustion unit contains two combustion chambers 72a and 72b and is driven at one-half the speed of the compressor rotors 31 and 40, as well as the driven expander rotors 80 and 94. However, the cylindrical combustion chamber block 70 could contain three or even four combustion chambers 72. In that case, since only one combustion chamber entry port 74 should be exposed during each rotation of the female compressor rotor 31, and likewise one exhaust port 76 exposed during each rotation of the female expander rotor 80, the combustion unit block 70 would be rotated at two-thirds or three-fourths of the speed of the main rotors 31 and 80, depending on whether there were three or four combustion chambers 72. Each combustion chamber is charged during one revolution of the compressor and expander female rotors 31 and 80 and discharged during the next revolution. Hence, with three combustion chambers, each chamber is inactive, i.e. remains void for dissipation of heat, during the third revolution of the main rotors and with four chambers, each is inactive during the third and fourth revolutions.

The provision of additional combustion chambers would enable the engine designer to allow for longer dwell periods before and/or after ignition and would, therefore, allow for greater rotational speed of the engine. In addition, one could allow more time for the possible transfer of heat from the combustion chamber wall to the compressed fuel-air mixture prior to ignition.

Assuming arbitrarily that zero degrees occurs where the lobe 52 and the helical groove 54 at the downstream end of the compressor rotors 31 and 40 are aligned, as shown in FIG. 2, the sequence of operation may be as follows:

| Event | Timing | Period |
| --- | --- | --- |
| Injection and compression | −285° to +15° | 300° |
| Dwell | +15° to 20° | 5° |
| Ignition | 20° | |
| Combustion | 20° to 80° | 60° |
| Expansion and exhaust | 80° to 430° | 350° |
| Dwell | 430° to 435° | 5° |
| Total | | 720° |
| Two full revolutions | | |

This describes a spark-ignited engine, but the engine 10 of our invention could readily be adapted for diesel operation, with a fuel injector replacing the spark plug 88. In such operation one would provide for a period of fuel injection.

This invention has been described with compressor and expander sections 14 and 18 comprising basically cylindrical bodies, one with a single helical lobe and the other with a complementary, single helical groove. However, it is to be understood that the invention covers as well, multiple lobes and complementary grooves, with the rotational speed of the rotors adjusted accordingly. Similarly, while the rotors have been described as complementary male and female rotors, features of the invention are applicable as well to identical, meshing rotors.

Lubrication

Since the expander 18 receives only fully combusted gases and such gases are at pressures of up to 1,000 psi, lubrication must entail a system other than conventional low pressure recirculating oil systems, or injection with the fuel charge.

Accordingly, oil is pumped under high pressure (say 1,000 psi) and very low volume into an oil gallery 120 (FIG. 2), which is bored axially in the cylinder wall 12 adjacent to the entry edge of the female rotor. Very small holes 122 are drilled between the gallery 120 and the cylinder internal surface 58 at appropriate intervals. A rod or shaft 124 with a small helical groove or passageway 126 turned around its periphery is snugly received within the oil gallery 120 and is driven in time with the female rotor 31 so that oil is injected between the female rotor 33 and its accommodating cylinder wall 58 just after the adjacent portion of the female groove or cavity 54 passes the oil hole 122. The rod 124 may be rotated by suitable intermediate gearing (not shown) from the gear 128 (FIG. 1) on the female rotor shaft 30. The timing may be set so that a small quantity of oil is injected at each rotation or at a given multiple of each rotation, depending on the lubrication requirements.

The oil deposited on the female rotor wall 58 tends to collect at the cusp 54a where the wiper 53 on the end of the lobe 52 can pick it up and further distribute the lubrication. Further, the trailing cusp 54b likewise distributes oil over the leading face 52a of the lobe 52 by means of its contact with the leading face.

The high pressure oil system lubricates both the compressor and the expander in the manner described above. For example, a similar rod with helical groove may be rotated by a gear 130 on the female expander rotor shaft 104. The same high pressure system likewise feeds the entire outer surface of the combustion chamber, with timed pulses coming from one or both of the oil galleries.

While this invention has been described in conjunction with preferred embodiments thereof, it is obvious that other modifications and changes therein may be made by those skilled in the art to which it pertains without departing from the spirit and scope of this invention, as defined by the claims appended hereto.

What is claimed as invention is:

1. An internal combustion engine comprising:
    a housing having an intake port at one end thereof and an exhaust port at the other end thereof;
    a compression chamber in said housing near said one end;
    compressor means in said compression chamber;
    said compressor means including a downstream compressor outlet wall rotating in said compression chamber;
    a compressor transfer port opening through said downstream outlet wall;
    an expansion chamber in said housing near said other end thereof to receive combusted gases;
    work means in said expansion chamber driven by expanding, combusted gases;
    said work means including an upstream expander inlet wall rotating in said expansion chamber;
    means rotating said compressor outlet wall at the same rotational drive speed as said expander inlet wall;
    an expansion chamber inlet port opening extending through said upstream inlet wall;
    a cylindrical combustion chamber block rotatable in said housing intermediate said compression chamber and said expansion chamber;
    said combustion chamber block having upstream and downstream end walls in face to face sealing engagement with said compressor outlet and expander inlet walls;
    at least two combustion chambers in said block, substantially equally spaced around said block, each with an inlet port through said upstream wall to receive a charge of compressed gas from said compressor transfer port and a discharge port through said downstream wall to release combusted gases through said expansion chamber inlet port;
    means rotating said block at a reduced speed relative to the speed of rotation of said compressor outlet wall and said expander inlet wall so that said compressor transfer port is aligned with and in communication with one of said combustion chamber inlet ports during a first portion of each revolution of said combustion chamber block, said combustion chamber inlet and discharge ports being closed off by said compression outlet wall and said expander inlet wall, respectively, during an intermediate portion of each revolution of said combustion chamber block and said expander inlet port is aligned with and in communication with said one combustion chamber discharge port during a third portion of each revolution of said combustion chamber block; and
    means for igniting said charge of compressed gas during said intermediate portion of each revolution of said combustion chamber block;
    said combustion chambers being substantially hemispherical;
    the speed of rotation of said compressor outlet wall is in the same ratio to the speed of rotation of said combustion chamber block as the number of combustion chambers in said block is to said number of combustion chambers less one.

2. The internal combustion engine defined by claim 1 wherein:
    said combustion chamber inlet and discharge ports and said compressor transfer and expander inlet ports are shaped and positioned to shut off said one combustion chamber from both said compression chamber and said expansion chamber during a combustion period occuring through an angle of rotation of said combustion chamber block of at least 15°.

3. The internal combustion chamber defined by claim 2 wherein:
    said combustion chamber inlet and discharge ports extend along arcs transversed by said compressor transfer port and said expander inlet port, respectively.

4. The internal combustion engine defined by claim 1 wherein:
    each of said combustion chambers is shorter axially than said expansion chamber.

5. The internal combustion engine defined by claim 1 wherein said compressor means comprise:

a pair of male and female compressor rotors mounted in said compression chamber for rotation about parallel axes;

said compressor rotors having cylindrical bodies;

said male compressor rotor having a helical lobe formed around and along its cylindrical body from end to end thereof; and said female compressor rotor having an oppositely directed complementary, helical groove in and around its cylindrical body receiving said helical lobe during rotation of said rotors in opposite directions.

6. An internal combustion engine comprising:

a housing having an intake port at one end thereof and an exhaust port at the other end thereof;

a compression chamber in said housing near said one end;

compressor means in said compression chamber;

said compressor means including a downstream compressor outlet wall rotating in said compression chamber;

a compressor transfer port opening through said downstream outlet wall;

a pair of male and female compressor rotors mounted in said compression chamber for rotation about parallel axes;

said compressor rotors having tangentially engaging cylindrical bodies;

said male compressor rotor having a single turn helical lobe formed around and along its cylindrical body from end to end thereof;

said female compressor rotor having an oppositely directed complementary, single turn helical groove in and around its cylindrical body receiving said helical lobe during rotation of said rotors in opposite directions;

the cylindrical body of said female compressor rotor being longer than said male compressor rotor so that there is an uninterrupted cylindrical portion with a circular end surface at the downstream end of said female rotor forming said compressor outlet wall;

an expansion chamber in said housing near said other end thereof to receive combusted gases;

work means in said expansion chamber driven by expanding, combusted gases;

said work means including an upstream expander inlet wall rotating in said expansion chamber;

means rotating said compressor outlet wall at the same rotational speed as said expander inlet wall;

an expansion chamber inlet port opening extending through said upstream inlet wall;

a cylindrical combustion chamber block rotatable in said housing intermediate said compression chamber and said expansion chamber;

said combustion chamber block having upstream and downstream end walls in face to face sealing engagement with said compressor outlet and expander inlet walls;

at least two combustion chambers in said block, substantially equally spaced around said block, each with an inlet port through said upstream wall to receive a charge of compressed gas from said compressor transfer port and a discharge port through said downstream wall to release combusted gases through said expansion chamber inlet port;

means rotating said block at a reduced speed relative to the speed of rotation of said compressor outlet wall and said expander inlet wall so that said compressor transfer port is aligned with and in communication with one of said combustion chamber inlet ports during a first portion of each revolution of said combustion chamber block, said combustion chamber inlet and discharge ports being closed off by said compression outlet wall and said expander inlet wall, respectively, during an intermediate portion of each revolution of said combustion chamber block and said expander inlet port is aligned with and in communication with said one combustion chamber discharge port during a third portion of each revolution of said combustion chamber block; and means for igniting said charge of compressed gas during said intermediate portion of each revolution of said combustion chamber block.

7. The internal combustion engine defined by claim 6 wherein:

said combustion chamber inlet and discharge ports and said compressor transfer and expander inlet ports are shaped and positioned to shut off said one combustion chamber from both said compression chamber and said expansion chamber during a combustion period occuring through an angle of rotation of said combustion chamber block of at least 15°.

8. The internal combustion chamber defined by claim 7 wherein:

said combustion chamber inlet and discharge ports extend along arcs traversed by said compressor transfer port and said expander inlet port, respectively.

9. The internal combustion engine defined by claim 6 wherein:

each of said combustion chambers is shorter axially than said expansion chamber.

10. The internal combustion engine defined by claim 6 wherein:

said combustion chambers are substantially hemispherical;

means rotating said combustion chamber block so that said drive speed is in the same ratio to the rotary speed of said combustion chamber block as the number of combustion chambers in said block is to said number of combustion chambers less one.

11. An internal combustion engine comprising:

a housing having an intake port at one end thereof and an exhaust port at the other end thereof;

a compression chamber in said housing near said one end;

compressor means in said compression chamber;

said compressor means including a downstream compressor outlet wall rotating in said compression chamber;

a compressor transfer port opening through said downstream outlet wall;

an expansion chamber in said housing near said other end thereof to receive combusted gases;

work means in said expansion chamber driven by expanding, combusted gases;

said work means including an upstream expander inlet wall rotating in said expansion chamber;

means rotating said compressor outlet wall at the same rotational speed as said expander inlet wall;

an expansion chamber inlet port opening extending through said upstream inlet wall;

a cylindrical combustion chamber block rotatable in said housing intermediate said compression chamber and said expansion chamber;

said combustion chamber block having upstream and downstream end walls in face to face sealing engagement with said compressor outlet and expander inlet walls;

at least two combustion chambers in said block, substantially equally spaced around said block, each with an inlet port through said upstream wall to receive a charge of compressed gas from said compressor transfer port and a discharge port through said downstream wall to release combusted gases through said expansion chamber inlet port;

means rotating said block at a reduced speed relative to the speed of rotation of said compressor outlet wall and said expander inlet wall so that said compressor transfer port is aligned with and in communication with one of said combustion chamber inlet ports during a first portion of each revolution of said combustion chamber block, said combustion chamber inlet and discharge ports being closed off by said compression outlet wall and said expander inlet wall, respectively, during an intermediate portion of each revolution of said combustion chamber block and said expander inlet port is aligned with and in communication with said one combustion chamber discharge port during a third portion of each revolution of said combustion chamber block; and means for igniting said charge of compressed gas during said intermediate portion of each revolution of said combustion chamber block;

said work means comprising:

a pair of male and female expansion rotors mounted in said expansion chamber for rotation about parallel axes;

said expansion rotors having tangentially engaging cylindrical bodies;

said male expansion rotor having a single turn helical lobe formed around and along its cylindrical body;

said female expansion rotor having an oppositely directed complementary, single turn helical expansion groove in and around its cylindrical body receiving said helical lobe during rotation of said expansion rotors in opposite directions;

said female expansion rotor being longer than said male expansion rotor so that there is an uninterrupted cylindrical portion with a circular end surface at the upstream end of said female expansion rotor forming said expander inlet wall; and said expansion chamber having a first cylindrical portion closely but rotatably receiving said female expansion rotor and a second cylindrical portion closely but rotatably receiving said male expansion rotor with helical lobe.

12. The internal combustion engine defined by claim 11 wherein:

said combustion chamber inlet and discharge ports and said compressor transfer and expander inlet ports are shaped and positioned to shut off said one combustion chamber from both said compression chamber and said expansion chamber during a combustion period occuring through an angle of rotation of said combustion chamber block of at least 15°.

13. The internal combustion chamber defined by claim 12 wherein:

said combustion chamber inlet and discharge ports extend along arcs traversed by said compressor transfer port and said expander inlet port, respectively.

14. The internal combustion engine defined by claim 11 wherein:

each of said combustion chambers is shorter axially than said expansion chamber.

15. The internal combustion engine defined by claim 11 wherein:

said combustion chambers are substantially hemispherical;

means rotating said combustion chamber block so that said drive speed is in the same ratio to the rotary speed of said combustion chamber block as the number of combustion chambers in said block is to said number of combustion chambers less one.

16. An internal combustion engine comprising:

a housing having an intake port at one end thereof and an exhaust port at the other end thereof;

a compression chamber in said housing near said one end;

a pair of compressor rotors mounted for rotation in said compression chamber;

one of said compressor rotors having a helical lobe formed around and along its body;

the other of said compressor rotors having an oppositely directed complementary, helical groove in and around its body receiving said helical lobe during rotation of said rotors in opposite directions;

said helical groove terminating short of the downstream end of said other rotor to form a compressor outlet wall;

a compressor transfer port opening through said compressor outlet wall;

an expansion chamber in said housing near said other end thereof to receive combusted gases;

a pair of expansion rotors mounted for rotation in said expansion chamber;

one of said expansion rotors having a helical lobe formed around and along its body;

the other of said expansion rotors having an oppositely directed complementary, helical expansion groove in and around its body receiving said helical lobe during rotation of said expansion rotors in opposite directions;

said other expansion rotor being longer than said one expansion rotor so that there is a circular end surface at the upstream end of said other expansion rotor forming an upstream expander inlet wall;

an expansion chamber inlet port opening extending through said upstream inlet wall;

means rotating said compressor rotors at the same rotational speed as said expansion rotors;

a combustion chamber block rotatable in said housing intermediate said compression chamber and said expansion chamber;

said combustion chamber block having upstream and downstream end walls in face to face sealing engagement with said compressor outlet and expander inlet walls;

said combustion chamber block and said other compression and expansion rotors all being in axial alignment;

at least two combustion chambers in said block, substantially equally spaced around said block, each with an inlet port through said upstream wall to receive a charge of compressed gas from said compressor transfer port and a discharge port through said downstream wall to release combusted gases through said expansion chamber inlet port;

means rotating said block at a reduced speed relative to the speed of rotation of said other rotors so that said compressor transfer port overtakes and traverses in communication with one of said combustion chamber inlet ports during a first revolution of said rotors, and said expander inlet port overtakes and traverses in communication with said one combustion chamber discharge port during a second revolution of said rotors, said one combustion chamber inlet and discharge ports being closed off by said compression outlet wall and said expander inlet wall, respectively, during a combustion period between such traversing movements; and means for igniting said charge of compressed gas during said combustion period.

* * * * *